United States Patent

Kummerfeld

[11] Patent Number: 5,288,277
[45] Date of Patent: Feb. 22, 1994

[54] CEILING PIVOT ARM WITH A THREADED PIVOT BEARING

[75] Inventor: Ryszard Kummerfeld, Lübeck-Travemünde, Fed. Rep. of Germany

[73] Assignee: Drägerwerk AG, Lübeck, Fed. Rep. of Germany

[21] Appl. No.: 22,960

[22] Filed: Feb. 25, 1993

[30] Foreign Application Priority Data

Apr. 18, 1992 [DE] Fed. Rep. of Germany ....... 4212996

[51] Int. Cl.⁵ .............................................. F16H 7/00
[52] U.S. Cl. ............................................... 474/198
[58] Field of Search ................ 474/198, 150; 384/620, 384/519, 535

[56] References Cited

U.S. PATENT DOCUMENTS

5,077,922 1/1992 Miller .............................. 474/198 X

FOREIGN PATENT DOCUMENTS

1558426 3/1977 United Kingdom .

Primary Examiner—Thuy M. Bui
Attorney, Agent, or Firm—McGlew and Tuttle

[57] ABSTRACT

A ceiling pivot arm to hold equipment that can be rotated, especially medical equipment which is held on a mount through a pivot bearing. Simple assembly of the rotary hinge is possible, whereby it is also easy to make and disassemble the connection between the mount and the pivot arm, so that high functional reliability is produced for operation. To do this, it is provided that the pivot bearing consists of a threaded ring (1) constituting the mount, in whose threads (3, 4) is engaged a threaded collar (2) movable relative to the mount and connected to the pivot arm.

8 Claims, 2 Drawing Sheets

CEILING PIVOT ARM WITH A THREADED PIVOT BEARING

FIELD OF THE INVENTION

This invention relates to a ceiling pivot arm to hold equipment that can rotate, particularly medical equipment in operating rooms, which is held on a mount by a pivot bearing.

BACKGROUND OF THE INVENTION

Such a ceiling pivot arm was disclosed by British Patent specification 1,558,426 corresponding to DE-OS 26 10 140. In the known ceiling pivot arm, one or more outriggers are held by a mount in the ceiling of a room, for example an operating room, with ability to rotate. The known pivot bearings have to permit easy-running rotating motion, on the one hand, and on the other hand they have to be designed so that considerable loads, typically up to 100 kg, can be held by more or less extended overhanging articulated arms. The two conflicting requirements of easy running of the pivot bearing on the one hand and precision power transmission exposed to the enormous lever forces on the other, with no possibility of tilting from the vertical from the weight, depending on the excursion of the pivot arm, make a costly design necessary for the pivot bearing that is costly in assembly and associated with some inadequacies with regard to operating reliability.

SUMMARY AND OBJECTS OF THE INVENTION

The problem underlying this invention and the object of the invention is thus to improve a ceiling pivot arm of the type mentioned so that simple assembly of the hinge is possible so that it is easy to make and disconnect the connection between the mount and the pivot arm, and so that high functional reliability is produced in operation.

This problem is solved by providing that the pivot bearing comprises a fixed threaded ring constituting the mount, with a threaded collar movable relative to the mount and connected to the pivot arm being engaged in its threads.

The advantage of the invention lies essentially in the fact, for example, that only one stable, solid threaded ring has to be mounted on the ceiling of an operating room to mount the ceiling pivot arm, so that the threaded collar connected to the pivot arm is screwed onto its threads in a simple way. The small pitch of the thread (a turn is 1 to 1.25) permits easy mounting; a fine-pitch thread that serves as a simple pivot bearing with adequate freedom from play, which is able to handle even high loads without tilting, may be suitable. The easy-turning threads provide for a smooth and uniform rotary motion during rotation, with the vertical motion being insignificant because of the small thread pitch. A simple but steadily practicable and reliable pivot bearing is obtained in this way.

To limit the angular excursion of rotation, it is useful to provide pins on the threaded ring and on the threaded collar, each located at different circumferential positions on a ring of fastening holes on the threaded ring and threaded collar, which run into one another as a rotational bumper when the threaded collar is turned. Only a single pin needs to be attached to the threaded collar, and on the stationary threaded ring, one or two pins are optionally screwed into different holes provided in the circle of fastening holes at different angular spacings, so that the angle of rotation for the articulated arm is determined by the position of the pins on the threaded ring.

To make possible damped rotational motion, particularly with regard to the bumper at the end of the rotational excursion, it is suitable to provide a rotational brake in the threaded ring. This is actuated at the end of the rotational excursion, for example, to make it possible to terminate the rotational motion gently so that equipment that is moved with the ceiling pivot arm does not run the risk of being damaged by impact forces.

Because of the simple construction of the pivot bearing a pneumatically inflatable tube ring can be provided as the rotational brake. This is preferably embedded in a recess around the threaded ring and is equipped with an expansion surface left exposed by the recess, which is brought into contact with a pressure surface on the threaded collar opposite the expansion surface, by producing overpressure inside the tube. To actuate the rotational brake, the inner chamber of the tube ring is brought to slight overpressure by a compressed air connection, so that the expansion surface bulges out of the recess somewhat and is pressed against the pressure surface on the threaded collar. The rotational motion is damped by the increased friction. The rotational brake can be released by relieving the overpressure inside the tube ring. A suitable tube ring for this is a silicone tube with circular internal cross section and square outer circumferential cross section. Such a ring is distinguished by good slip properties and high long-term stability.

To bring about mechanical rotation of the pivot bearing, the threaded collar is connected to a drive.

This drive can consist simply of a belt placed around the outer circumference of the rotary collar on the one hand and around the drivewheel of an electric motor on the other. Such a belt drive is distinguished by high reliability and easy assembly. The angle of excursion and the speed of rotational motion can be determined by controlling the operating time of the motor and its speed and direction of rotation.

The pivot bearing is suitable not only for holding the articulated arm on a ceiling, but it can be used in precisely the same way as a rotational hinge for two interlocked outrigger arms of an articulated arm. The threaded ring constituting the mount in this case is provided in one outrigger arm, and the threaded collar is attached to the other outrigger arm, and then serves as the joining element between the two outrigger arms.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
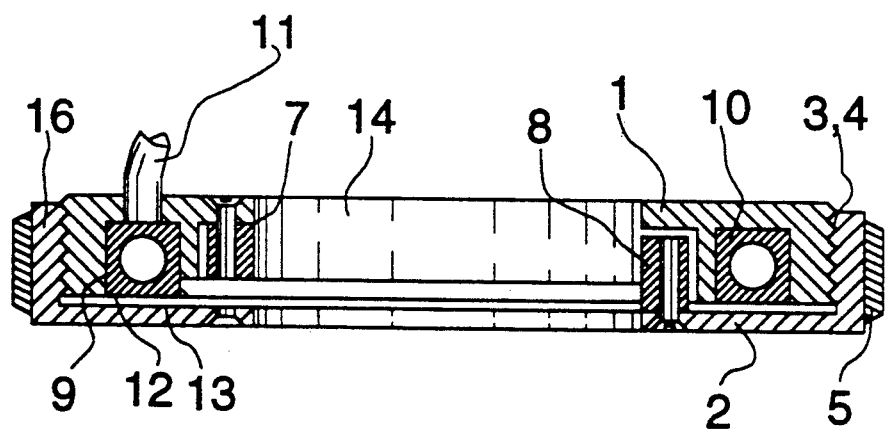
FIG. 1 is a schematic cross sectional view through the threaded ring and the threaded collar according to the invention.

In FIG. 1 the pivot bearing is illustrated in cross section and is composed of a threaded ring 1 on the one hand and a threaded collar 2 on the other. The threaded ring 1 and the threaded collar 2 are provided respectively with an outer thread 3 and an inner thread 4 with which they are screwed into one another. The threaded ring 1 is fastened by screws to a ceiling, not shown, and the threaded collar 2 is screwed to a pivot arm, likewise not illustrated. The rotational motion itself is transmitted from a drivewheel 6 of an electric motor through a drive belt 5 to the outer surface of the threaded collar 2. The rotary motion is limited by pins 7 and 8 attached respectively to the threaded ring I and to the threaded collar 2. When the threaded collar 2 in the form illustrated is rotated by about 180°, the pin 8 runs into the pin 7 and thus constitutes the limit stop for the rotary motion. An encircling recess 9 is machined into the threaded ring 1 on the circumference in the vicinity of the thread 3, in which a tube ring 10 with square external cross section is held, and which can be exposed to internal overpressure by a compressed air connection 11. An expansion surface 12 of the tube ring 10 left exposed by the recess 9 is opposite a pressure surface 13 on the threaded collar 2. When the interior of the tube is pressurized, the expansion surface 12 expands outward and presses against the pressure surface 13 of the threaded collar 2 and acts as a brake. A passage 14 is provided both in the threaded ring 1 and in the threaded collar 2, through which any supply lines are provided, for example for electricity, compressed air, oxygen, and other media that are necessary to supply the equipment held by the ceiling pivot arm.

Figure 2:
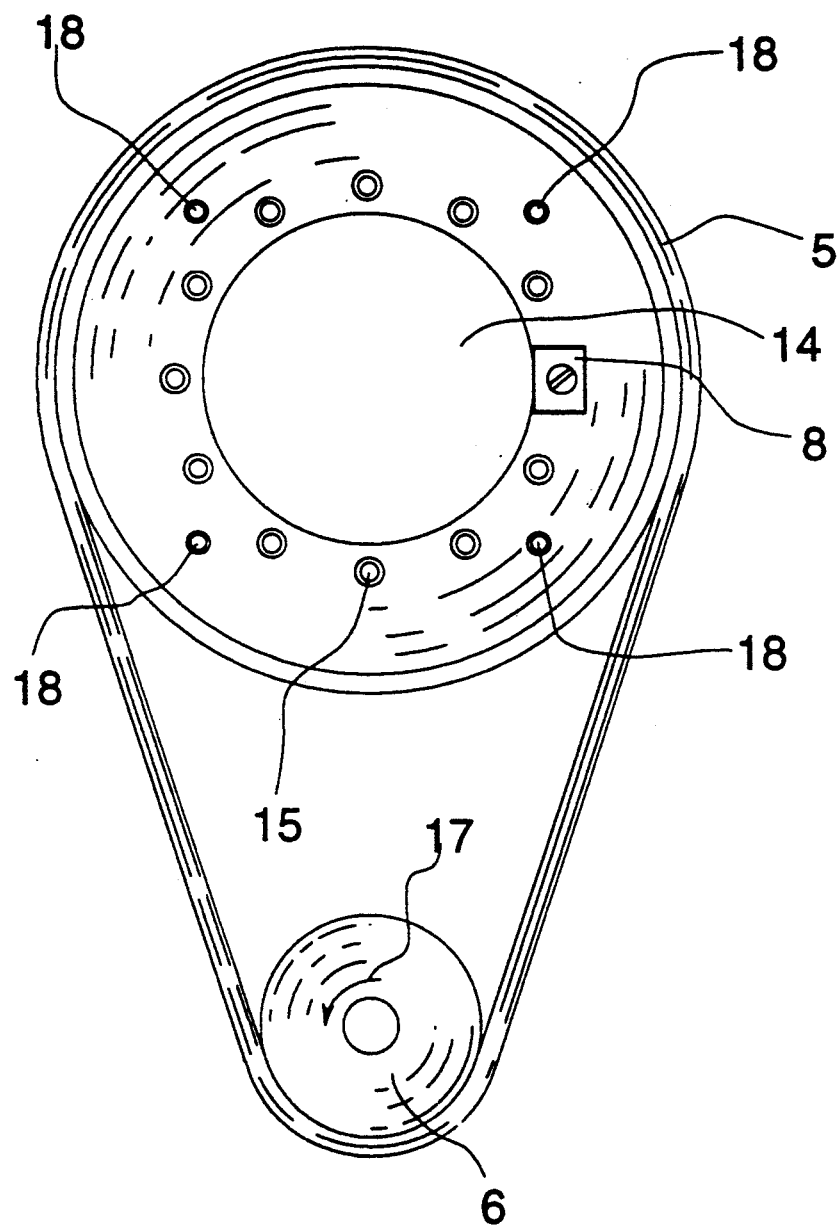
FIG. 2 is a schematic plan view of the pivot bearing with a motor drive according to the invention.

FIG. 2 shows a plan view of the threaded collar 2, which has a circle of holes 15 around its passage 14 for fastening the pins 8 that determine the angle for the rotational motion depending on their position on the circle of holes. The drive belt 5 is placed around the rim 16 of the threaded collar 2, and at the same time is connected to the drivewheel 6 of an electric motor, not shown. The rotational motion of the drivewheel 6 in the direction of the arrow 17 is transmitted to the rim 16 of the threaded collar 2. The threaded collar is fastened to the pivot arm by the fastening screws 18.

While a specific embodiment of the invention has been shown and described in detail to illustrate the application of the principles of the invention, it will be understood that the invention may be embodied otherwise without departing from such principles.

What is claimed is:

1. A pivot bearing mount for a ceiling pivot arm for holding equipment such as medical equipment that can be rotated in operating rooms, comprising:
   a ring with an external threaded surface, said ring forming a ceiling mount; and
   a threaded collar with an internally threaded surface, said collar being movable relative to said mount and said collar being connected to the pivot arm.

2. A pivot bearing mount according to claim 1, wherein:
   said threaded ring includes a pin positioned at a radial distance and said threaded collar includes a pin positioned at said radial distance of said threaded ring pin, said pins defining a rotational limit stop when said pins abut each other upon turning said thread collar a predetermined distance relative to said threaded ring.

3. A pivot bearing mount according to claim 1, wherein:
   said threaded ring supports a rotational brake.

4. A pivot bearing mount according to claim 2, wherein:
   said threaded ring supports a rotational brake.

5. A pivot bearing mount according to claim 3, wherein:
   said rotational brake includes a pneumatically inflatable tube ring imbedded in a recess encircling said threaded ring, said inflatable tube ring including an expansion surface exposed by said recess, said expansion surface being positioned opposed from a pressure surface located on said threaded collar opposite said expansion surface whereby braking results upon said expansion surface contacting said pressure surface when an overpressure state is produced inside said inflatable tube ring.

6. A pivot bearing mount according to claim 1, wherein:
   said threaded collar is connected to a drive for imparting rotary motion to said threaded collar.

7. A pivot bearing mount according to claim 6, wherein:
   said drive includes a belt connected to a drive wheel of an electric motor, said belt being connected about an outer circumference of said rotating collar.

8. A pivot bearing mount according to claim 1, wherein:
   said threaded ring defines a thread pitch in the range of 1 to 1.5.

* * * * *